United States Patent [19]

Black et al.

[11] Patent Number: 4,489,131

[45] Date of Patent: Dec. 18, 1984

[54] SIZE FOR GLASS FIBERS

[75] Inventors: Denny E. Black; David W. Garrett, both of Newark, Ohio

[73] Assignee: Owens-Corning Fiberglas Corporation, Toledo, Ohio

[21] Appl. No.: 572,033

[22] Filed: Jan. 19, 1984

Related U.S. Application Data

[62] Division of Ser. No. 455,789, Jan. 6, 1983, Pat. No. 4,448,917.

[51] Int. Cl.³ .................... B32B 17/04; B32B 27/06; C08K 5/09
[52] U.S. Cl. ................................. 428/391; 428/375; 428/378; 428/392; 428/394; 428/395; 428/441; 428/442; 428/447; 428/411.1
[58] Field of Search ............... 523/206; 524/285, 160, 524/296, 298, 300, 287; 428/375, 378, 391, 392, 394, 395, 441, 442, 447, 411

[56] References Cited

U.S. PATENT DOCUMENTS

| | | | |
|---|---|---|---|
| 3,909,477 | 9/1975 | Madison | 524/285 |
| 3,936,415 | 2/1976 | Coakley | 523/206 |
| 4,278,586 | 7/1981 | Marzola | 524/285 |
| 4,338,234 | 7/1982 | Moore | 523/206 |

Primary Examiner—Ellis P. Robinson
Attorney, Agent, or Firm—Ronald C. Hudgens; Greg Dziegielewski; Philip R. Cloutier

[57] ABSTRACT

A size for glass fibers is disclosed, the size comprising an oxidized polyolefin, a polymeric film former and an organic acid, preferably terephthalic acid or isophthalic acid.

3 Claims, No Drawings

SIZE FOR GLASS FIBERS

This is a division of application Ser. No. 455,789, filed Jan. 6, 1983, now U.S. Pat. No. 4,448,917.

TECHNICAL FIELD

This invention relates to a size for glass fibers.

In one of its more specific aspects, this invention relates to a size for glass fibers employed in reinforcing polypropylene.

One very satisfactory size is a glass fiber coating comprising an oxidized polyolefin, a silane coupling agent and, as a film former, a carboxylated high molecular weight elastomer having a molecular weight of at least about 200,000. The composition has been found to provide an excellent bond between the glass fibers and the polyolefin matrix into which such coated glass fibers have been incorporated for reinforcing purposes.

There now has been developed an improvement in the above-described size. This improvement results in an increase in tensile strength, flexural strength, heat distortion resistance and impact strength of the injection molded polypropylene into which glass fibers, coated with the improved size, are incorporated.

STATEMENT OF THE INVENTION

According to this invention there is provided a glass fiber size comprising the residue obtained by removing water from an aqueous composition comprising a polyolefin latex, a silane, a polymeric film former, preferably one having a molecular weight of at least about 200,000, a base and an organic acid selected from the group consist of substituted benzoic acids, benzenedicarboxylic acids, benzenetricarboxylic acids, benzenetetracarboxylic acids, benzenepentacarboxylic acids, benzenehexacarboxylic acids, cyclohexanedicarboxylic acids, fatty acids, alphatic diacids, aliphatic polyacids, cinnamic acids, benzenediacrylic acids, benzenediacetic acids, naphthoic acids, naphthalenedicarboxylic acids, naphthalenedisulfonic acids and anhydrides of the aforesaid acids.

Also according to this invention, there is provided glass fibers sized with the aforesaid size and polyolefin resins incorporating glass fibers sized with the aforesaid size.

DESCRIPTION OF THE INVENTION

The method of this invention is employable with any size and type of glass fiber. It is also employable with any type of polyolefin resin including polypropylene, polyethylene, and the like.

This invention can employ any suitable method of applying the size to the glass fiber and any suitable method of incorporating the sized glass fiber in the polyolefin.

In the preferred embodiment of the invention, the size composition will be comprised of the following:

| Component | % By Weight As Received | Pounds Per 100 Gals. |
| --- | --- | --- |
| Terephthalic Acid | 2.2 | 18.8 |
| Ammonium Hydroxide | 2.2 | 18.8 |
| Oxidized Polypropylene Latex | 7.5 | 62.6 |
| Carboxylated SBR Latex | 2.8 | 23.4 |
| g-amino-propyltriethoxysilane | 1.0 | 8.4 |
| Deionized water | Bal. | Bal. |
| Total | 100.00 | 834.00 |

The size can comprise any emulsified acid grafted or oxidized polypropylene latex. The polypropylene latex will be included in the size composition in an amount within the range of from about 0.5 to about 25 weight percent.

One suitable oxidized polypropylene latex is Epolene E-43 made by Eastman Chemical. This material is emulsified by Proctor Chemical, Salisbury, N.C., and the emulsion is called "Icopol OC."

Any suitable carboxylated high molecular weight latex having a solubility parameter similar to that of the oxidized polyolefin latex can be employed. This material will be included in the size composition in an amount within the range of from about 0.5 to about 15 weight percent.

One suitable material is available from the Goodyear Tire and Rubber Company, Akron, Ohio as LPR-6599. This material comprises a carboxylated styrene-butadiene latex having an approximate styrene/butadiene ratio of 65/35, a synthetic anionic emulsifier, a total solids content of 53, a Brookfield Viscosity of 150 cps., a pH of 8.5, a surface tension of 50 dynes/cm., a specific gravity of 1.022 and contains 8.5 pounds of latex per gallon. This material acts as a strand integrity agent and, while a material comparable to the above is preferred, other materials such as polyurethanes, epoxies, polyesters, poly (vinyl acetates) acrylics, and combinations thereof can be employed.

Any suitable amino silane can be employed. Suitable silanes include gamma-amino-propyltriethoxysilane, N-(beta-aminoethyl)-gamma aminopropyltrimethoxysilane and polyaminofunctional silanes. Suitable materials include A1100, A1120 and A1130, respectively, all of which are available from Union Carbide Corporation, New York, N.Y. This material will be included in the size composition in an amount within the range of from about 0.1 weight percent to about 5 weight percent.

In the preferred embodiment of this invention, the acid is either terephthalic acid or isophthalic acid, either of which will be incorporated in the size in an amount within the range from about 0.5 to about 4 weight percent. In the most preferred embodiment of the invention, the acid will be terephthalic acid which will be incorporated in the size in an amount of about 2.2 weight percent.

In the preferred embodiment of the invention, a first premix is prepared by mixing 8.3 pounds of the silane into 40 gallons of the water and slowly adding 18.8 pounds of the terephthalic acid. 18.8 pounds of ammonium hydroxide are then introduced into the resulting composite.

A second premix is prepared by adding 62.6 pounds of Icopol OC to 10 gallons of water. This composite is added to the first premix to form composite I.

A third premix is prepared by adding 23.4 pounds of SBR latex to 10 gallons of water. This mixture is added to composite I to form composite II.

Composite II, the final size composition, is then agitated while being maintained between 50° and 70° F. It should have a pH within the range of 8–9, and a viscosity at 60° F. in the range of 10 to 20 cps.

The glass size of this invention can be applied to glass fibers using conventional methods. It will preferably be applied to the glass fiber in an amount to impart to the fiber a loss on ignition within the range of from about 0.2 to about 3.0 weight percent and preferably from about 0.7 to about 0.8 weight percent.

The sized glass strand will be dried and collected in the usual manner.

The following data demonstrate the improved mechanical and thermal properties of polypropylene reinforced with 20 weight percent of identical glass fibers sized to the same extent with three different glass sizes.

Size I is a size of the type described herein except that instead of terephthalic acid, bis-maleamic acid was employed at a weight percentage of 3.25, as suggested in U.S. Pat. No. 4,278,586 issued July 14, 1981.

Size II is a size of the type described in U.S. Pat. No. 3,936,415 which is basically a comparable size but without the presence of the acid.

Size III is comparable to that of U.S. Pat. No. 3,936,415 into which terephthalic acid has been incorporated as described above, and which is the size of this invention.

Tests were made under comparable conditions in which the polypropylene-glass composite was extruded and the extrudate was injected molded.

Results were as follows:

| Polypropylene-Glass Plus Size No. | I | II | III |
|---|---|---|---|
| Tensile Strength, (MPa) | 60 | 45 | 59 |
| Tensile Modulus, (GPa) | 5.3 | 5.4 | 5.6 |
| Elongation, (%) | 2.43 | 1.8 | 2.2 |
| Flexural Strength, (MPa) | 99 | 76 | 99 |
| Flexural Modulus, (GPa) | 4.6 | 4.7 | 4.7 |
| Izod Impact Energy, (J/M) | | | |
| Unnotched | 278 | 246 | 326 |
| Notched | 100 | 91 | 96 |
| Heat Deflection Temp. (°C.) (264 psi) | 137 | 136 | 142 |

It is evident from the foregoing that the size composition of this invention imparts to the glass-reinforced polypropylene decidedly improved results in all properties tested.

It will be evident from the foregoing that various modifications can be made to this invention. Such, however, are considered within the scope of this invention.

We claim:

1. A glass fiber sized with a size comprising a polyolefin latex, an amino silane, a polymeric film former and an organic acid selected from the group consisting of substituted benzoic acids, benzenedicarboxylic acids, benzenetricarboxylic acids, benzenetetracarboxylic acids, benzenepentacarboxylic acids, benzenehexacarboxylic acids, cyclohexanedicarboxylic acid, fatty acids, aliphatic diacids, aliphatic polyacids, cinnamic acids, benzenediacrylic acids, benzenediacetic acids, naphthoic acids, naphthalenedicarboxylic acids, naphthalenedisulfonic acids and anhydrides of the aforesaid acids said acid or acids being added in an amount sufficient to improve the impact strength of injected molded polypropylene into which glass fibers, coated with said size, are incorporated.

2. A glass fiber sized with the size of claim 1.

3. A composite comprising a polymer reinforced with glass sized with the size of claim 1.

* * * * *